INVENTOR - RONALD R. DYSART
ATTORNEY

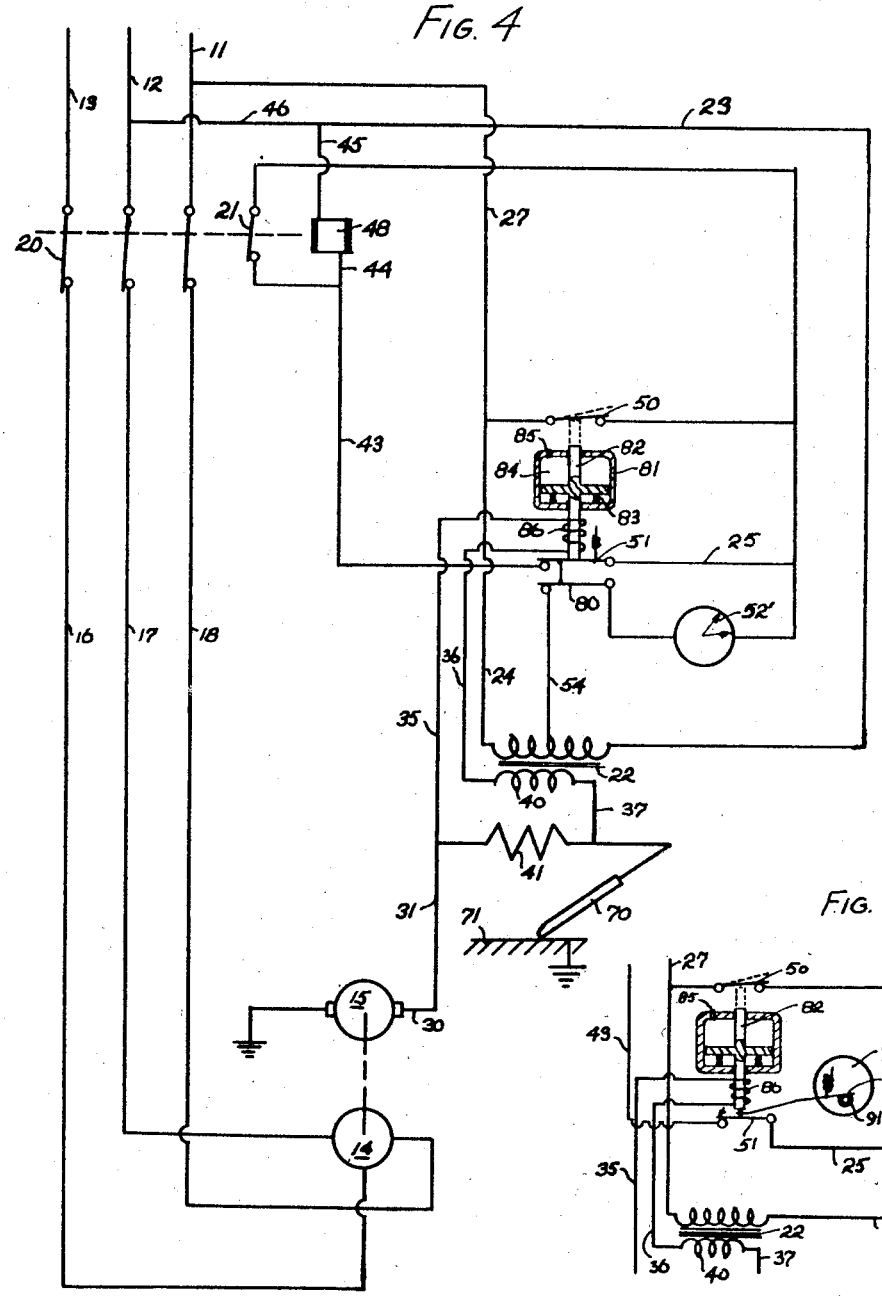

Patented Sept. 9, 1947

2,427,127

UNITED STATES PATENT OFFICE 2,427,127

AUTOMATIC CONTROL OF ALTERNATING CURRENT-DIRECT CURRENT MOTOR-GENERATOR SET

Ronald R. Dysart, Oakland, Calif., assignor to Frank H. Varney, an individual doing business as D-V. Welding Controls, Oakland, Calif.

Application April 25, 1944, Serial No. 532,675

3 Claims. (Cl. 171—123)

My invention relates to automatic control means for electric arc welding machines.

One of the problems in the operation of these machines is the waste of power, consumed during the periods when welding is not actually being done. In the average machine the welder is considered very good if his arc time, that is, actual welding time, is 25% of his total hours worked. Thus, in an 8 hour day, 75% of the time or 6 hours, the machine is running and doing no productive work.

The principal object of my invention is to provide a control means which effects the automatic starting of the welding machine merely touching the welding rod to the grounded work, and which stops the machine after a predetermined time interval has elapsed following completion of a welding operation. This results in conservation of electric power, which is an advantage to the owner from an economic point of view and to the Nation from the standpoint of conservation of natural resources.

Another object of my invention is to provide a solution to the problem of checking on how effective use a welder is making of a machine. This feature of production totalizing is a contribution of substantial value for increasing production efficiencies and reduction of construction manhours.

My device may be manufactured so that a single unit will perform both the automatic starting and stopping function as well as totalizing of the arc time or it may be built so that either of the features are obtainable in individual single units. The unique design makes it inherently possible first to utilize the unit embodying either feature and then later to add the second feature.

Other objects and advantages of my invention will become apparent from the following description and drawings which are furnished pursuant to U. S. Rev. St. 4888 as illustrative embodiments, and expressly without any intention of limiting the interpretation of the appended claims to these specific forms of apparatus.

In the drawings,

Fig. 4 shows another modification in the timing and time recording mechanisms, and Fig. 5 shows a further modification in the timing recorder.

Figure 1:
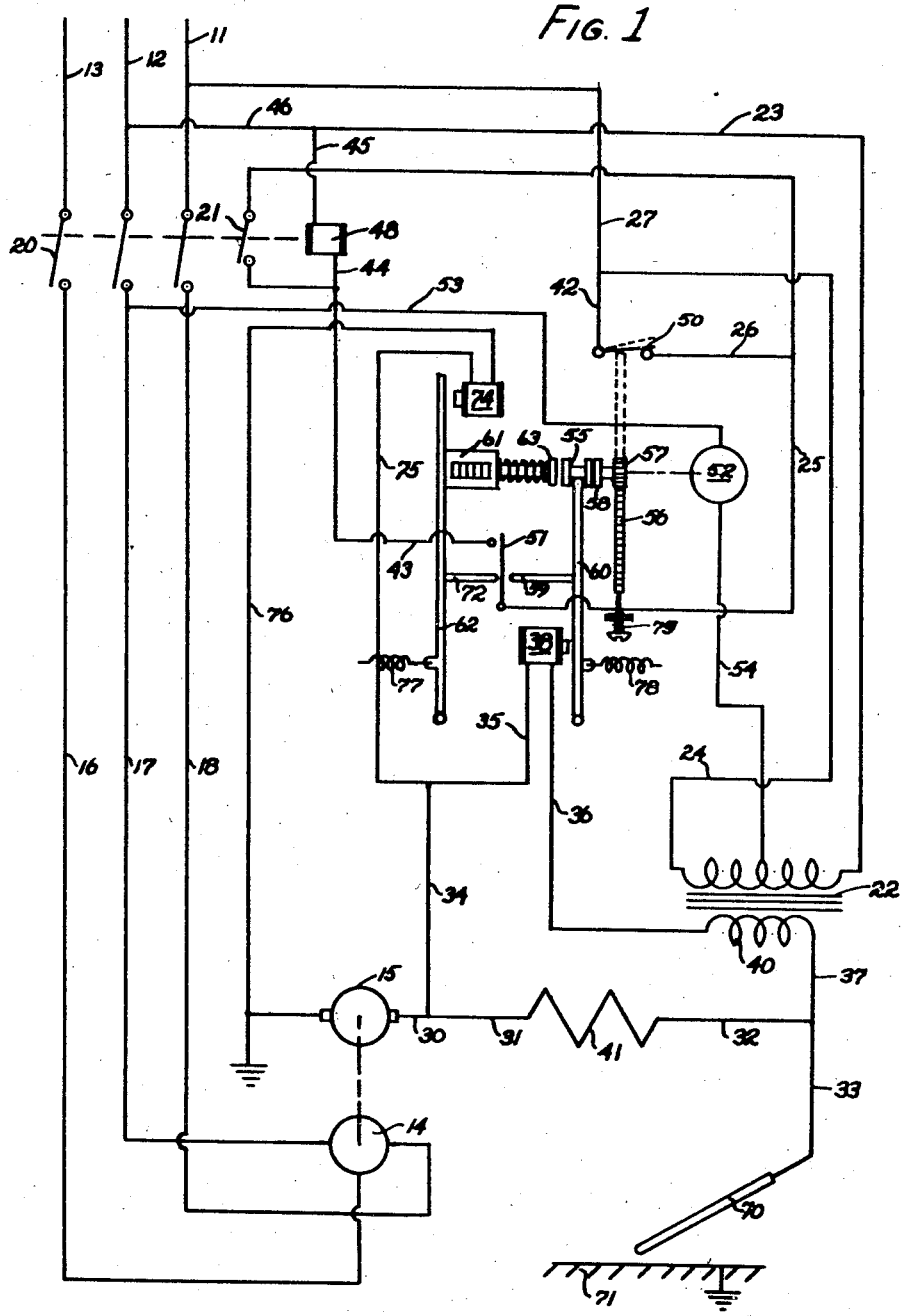
Fig. 1 is a diagrammatic view of one form of device showing the circuits in the "off" or idle position.

Referring now to Fig. 1, it will be seen that the basic elements of the combination there illustrated include the following:

Conductors 11, 12 and 13 represent a suitable alternating current supply line. A motor generator set, consisting in this instance of alternating current driving motor 14 and a direct current welding generator 15, has the terminals of the motor connected to the conductors 16, 17 and 18. A suitable magnetically operated starter switch 20 is provided, which when closed connects conductors 11, 12 and 13 with conductors 16, 17, 18. This starter switch is shown provided with conventional interlock contacts or switch 21, which is operated in conjunction with the other movable parts of the switch. A suitable alternating current transformer 22 is provided, having one side of its primary connected to current supply line 12 by conductor 23, and having the other side of its primary connected by conductor 24 to conductor 27, and from thence to the current supply line 11. Thus this transformer is continuously excited with alternating current from the current supply line.

The secondary winding 40 of transformer 22 is connected in series with a magnet 38 and directly across a reactor 41 in the welding circuit. Thus one side of the secondary winding 40 is connected by conductor 36 to magnet 38, and the other side of this magnet connects by conductors 35, 34 to conductor 31 in the welding circuit, which in turn connects to one side of the reactor 41. The other side of winding 40 is connected by conductor 87 to conductor 32, which is likewise in the welding circuit and which connects to one side of reactor 41. The welding circuit itself, or load circuit as it may be termed, includes the welding generator 15, one side of which is grounded, conductors 30, 31, reactor 41, conductor 32, conductor 33, welding rod 70, and the grounded work 71. Reactor 41 is of such a value that it offers very little resistance to the direct current of the welding circuit.

The control circuits connected to the electromagnet 48 include a starting control circuit which can be traced as follows: One side of magnet 48 is connected to conductors 44, 43 to one contact of switch 51. The movable element of this switch is connected by conductor 25 to one side of the switch 21. The other side of this switch connects with a conductor 44. In addition to the circuit just specified a circuit is provided by way of conductor 26 which connects with conductor 25, switch 50, and conductors 42, 27 which lead to the current supply line 11. Briefly it may be explained at this point that switch 51 when closed performs a starting function in effecting closing of the main switch 20, whereas switch 50 when opened performs a stopping function in that it effects deenergization of magnet 48 with opening of the main switch. A timing motor 52 is also provided and is adapted to be energized by having its one side connected by conductor 53 with conductor 17, and its other side connected by conductor 54 to a midpoint on the primary of transformer 22. The shaft of this motor has a sliding clutch member 55 splined upon the same.

In addition to the above, timing means is provided utilizing a gear rack 56, together with a pinion 57 which is loosely mounted on the motor shaft. Clutch member 58 is rotatable with pinion 57, and is engageable by the clutch element 55. When so engaged rack 56 is raised at a predetermined rate until it opens the normally closed switch 50. Clutch element 55 is shifted by an armature 60, which in turn is actuated by the electromagnet 38 and the return spring 78. A suitable counter 61 can be rigidly mounted in the frame, or it can be carried on the armature 62 as shown.

The means for placing the counter in operation is the clutch member 55, which is engaged with a corresponding clutch member 63 in response to the full force of the electromagnet 38. The armature 62 is moved by coil 74 in circuit 75, 34, 30 and 76 whenever the generator is rotating and welding voltage exists. Springs 77 and 78 return armatures 62 and 60 to their other positions when their respective electromagnets are deenergized.

It may be explained that many types of motor starter switches are available on the market which can be used with my system for the main switch 20. Such switches are operated magnetically and are supplied with control circuits and start and stop contacts for controlling the operating magnet (corresponding to magnet 48). It should be understood that switch 51 either shunts or takes the place of the conventional start contact, while switch 50 is connected in series with or takes the place of the conventional stop contacts. The circuits connecting these switches or contacts with the magnet 48 and the source of current supply can be termed start and stop control circuits.

The operation of the above device is as follows:

When the main disconnect switch (not shown), which supplies energy to the A. C. lines 11, 12, 13 is closed, the transformer 22 is energized thereby placing its secondary electromotive force across the relay 38 and across the reactor 41 which is a specially designed reactor suitable to permit the flow of the entire output of the welding generator. Now turn to Fig. 2 of the drawings to see the next step. When the operator touches the welding rod 70 to the grounded work 71 relay 38 becomes fully energized and operates armature 60. Armature 60 moves the clutch 55 to the left, disengaging clutch faces 55, 58 and also closes the switch 51 which closes the motor-generator circuit magnetic switch 20 and starts the motor-generator set. The switch 51 is shown as a single pole positioning switch constructed so that when it is closed it remains closed until opened by the rod 72 on armature 62. This reduces the possibility of burning contact points when coil 38 is momentarily energized. However, I have found that a normally open type switch in place of switch 51 works satisfactorily. Now turn to Fig. 3 of the drawings. Almost instantly after switch 51 is closed the motor generator set comes up to full speed. Then the voltage across the generator comes up to the preset value and energizes coil 74, thereby attracting armature 62. Armature 62 performs two functions at this point in the operation. It resets (opens) the switch 51 and it positions the counter 61 for properly engaging the clutch members 63 and 55. The parts will stay in this position so long as the welding continues.

When the welding ceases, the parts will be in the position shown in Fig. 1 except that switch 20 will be closed. Clutch faces 55 and 58 will be engaged and the motor 52 which turns shiftable clutch 55 at a suitable speed such as (1 R. P. M.) will cause clutch face 58 to turn the pinion 57 and raise the gear rack 56. If the parts continue in this position for the predetermined time, the rack 56 will lift the switch 50 into the dotted line position. This arrangement whereby the rack 56 lifts the switch member 50 is for the purpose of providing a time delay interval before stopping the motor generator set by opening switch 20. An adjustment is provided by the screw 79 so that the time delay interval may be chosen from a few seconds to several minutes time before the rack 56 will open switch 50. If welding is not resumed during the predetermined time delay interval, the rack 56 will raise and open the normally closed switch 50, thereby deenergizing the magnetic switch coil 48 and stopping the motor generator set 14, 15.

If the welding electrode 70 is again touched to the work and an arc is established before the time interval has elapsed coil 38 will become fully energized, since reactor 41 will become saturated when the D. C. output of the generator 15 is used. Armature 60 then will disengage clutches 55 and 58, and will reengage clutch 55 with clutch 63. The gear rack 56 will then drop and reset to its original setting against screw 79 and the clutch 63 will turn the counter 61. Counter 61 is suitably chosen to count the desired unit of time. Then so long as the arc remains established with the work the parts will be in the position of Fig. 3.

An arc time anti-stealing feature is incorporated in my device. For normal arc voltages, coil 74 holds armature 62 in position for the counter 61 to record arc time. However, if an operator attempts to record a false arc time by shorting his rod 70 to the work 71, the voltage across coil 74 will drop below the normal arc voltage and will release the armature 62, thereby disengaging clutches 63 and 55.

The device may be used as an arc time totalizer only or it may be used as a starter and stopper only.

Figure 2:
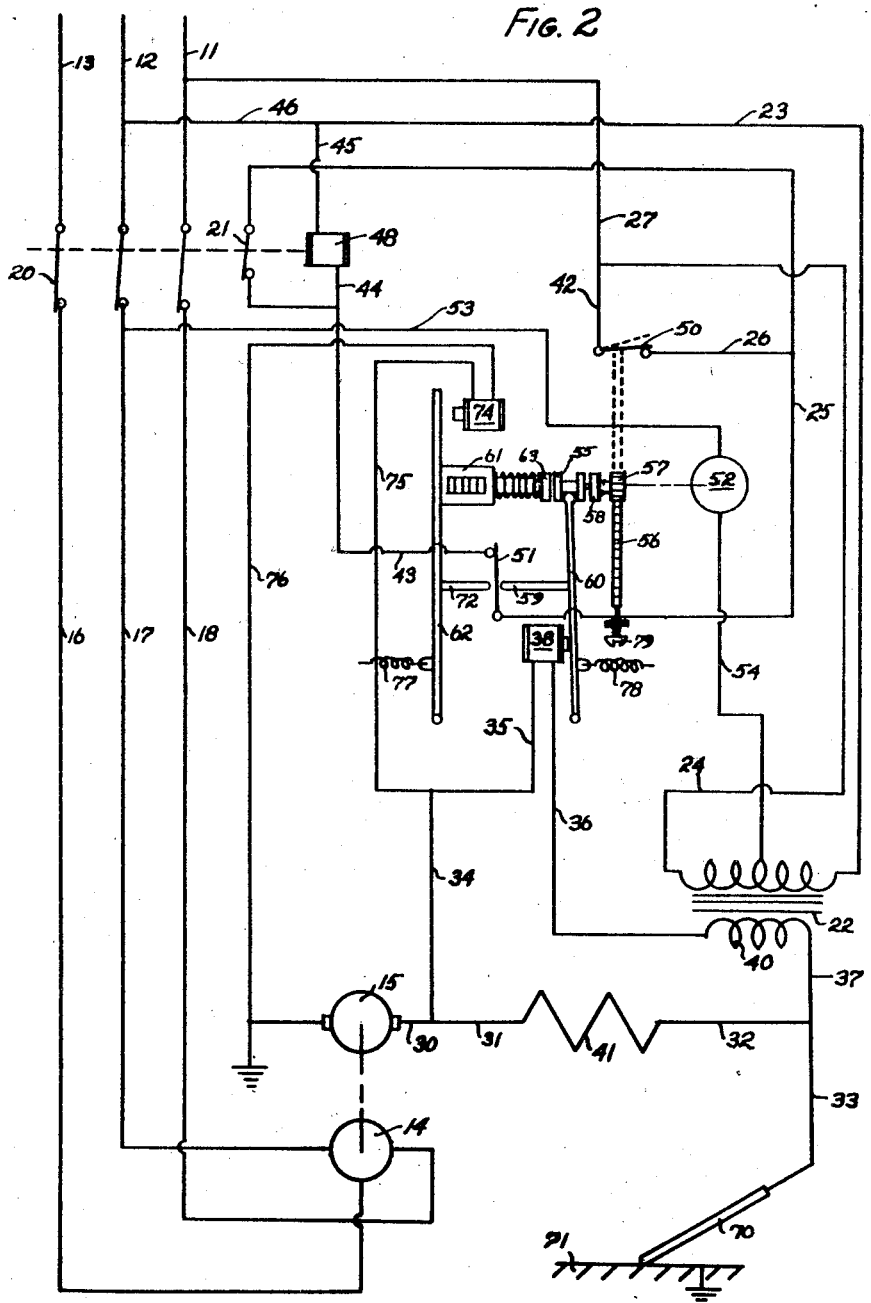
Fig. 2 is a like view showing the circuits immediately after initial contact of the welding electrode with the work.
Figure 3:
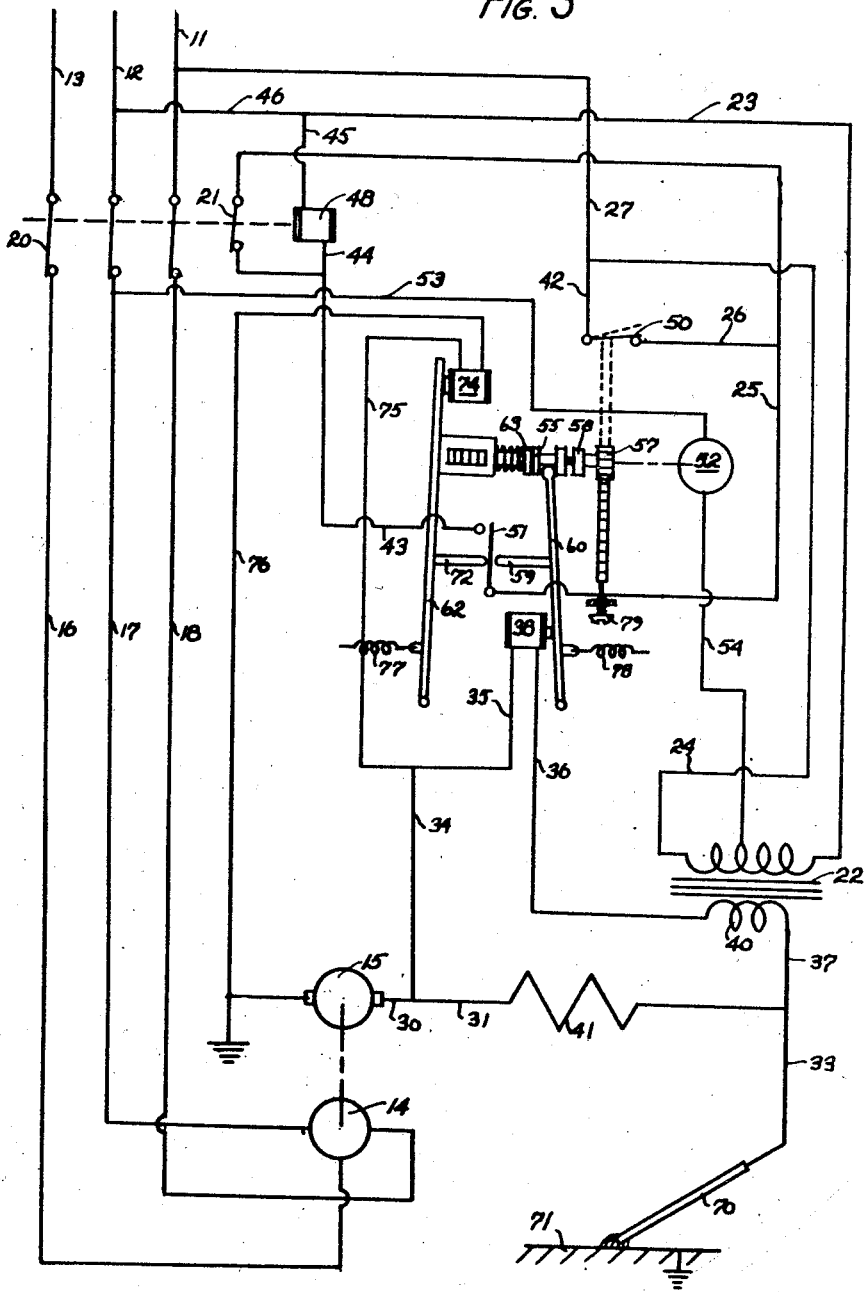
Fig. 3 is a like view during the welding periods.

The modification shown in Fig. 4 substitutes a dashpot time delay means for the rack and pinion device used in Figs. 1 to 3. Also in place of the clutch for driving the counter, I have substituted a synchronous motor-driven time means which will record the time elapsed when the electrode 70 is in contact with the work. In Fig. 4 the dashpot 81 is mounted adjacent the normally closed switch 50 so that the dashpot plunger rod 82 will open the switch at the end of its upward stroke under the impulse of spring 83. Its speed of upward movement is limited and regulated by the size of vent 85 in the cylinder chamber 84. Preferably the vent 85 has a check valve which will allow rapid inward flow of air into chamber 84 as the solenoid 86 pulls the plunger rod downward. At the lower limit of its downward movement it engages a normally open switch 51 and closes it and also closes switch 80 which may be connected to it. The closing of switch 80 starts the synchronous clock 52' which will record the welding arc time. Here, as in the case of the device of Figs. 1 to 3, whenever the welder removes the electrode 70 from the work 71, the solenoid 86 will be deenergized and if the electrode is not returned to contact with the work before the spring 83 can push the rod 82 through its full upward stroke, the rod 82 will open normally closed switch 50 and the motor-generator set will shut down. Then if the operator again touches the electrode 70 to the work 71 the solenoid 86 will allow switch 50 to close and will close switch 51, which will energize the motor-generator magnetic starting switch 48.

The modification shown in Fig. 5 is like that shown in Fig. 4 except that in place of a synchronous electric timing means, I have substituted a spring or weight actuated time piece 90 which is equipped with a suitable brake 91 having an actuating lever 92 adapted to be engaged by the plunger rod 82 on its downward stroke. Thus whenever the electrode 70 is in contact with the work 71 and the solenoid 86 has drawn rod 82 downwardly, the brake 91 will be released and welding time will be recorded on the clock 90.

As stated at the outset, it is not my intention to limit my invention to the devices used herein to illustrate one embodiment and a modification or two.

What I claim is:

1. In an electrical system of the type having an alternating current motor adapted to be connected to alternating supply lines through a starter switch and a direct current generator driven by the motor and connected to a load circuit, the starter switch having control circuits for causing closing and opening of the main switch in response to closing and opening of start and stop contacts, a reactor of relatively low direct current resistance connected in series with the load circuit, a transformer having its primary supplied with alternating current from said current supply lines, and means including a magnet serving when energized to effect closing of said starter contacts, the secondary of the transformer being connected across said reactor in series with said magnet whereby when the load circuit is closed the alternating current flowing in the secondary of the transformer is increased to operate said magnet.

2. In an electrical system of the type having an alternating current motor adapted to be connected to alternating supply lines through a starter switch and a direct current generator driven by the motor and connected to a load circuit, the starter switch having control circuits for causing closing and opening of the main switch in response to closing and opening of start and stop contacts, a reactor of relatively low direct current resistance connected in series with the load circuit, a transformer having its primary supplied with alternating current from said current supply lines, means including a magnet serving when energized to effect closing of said starter contacts, the secondary of the transformer being connected across said reactor in series with said magnet whereby when the load circuit is closed the alternating current flowing in the secondary of the transformer is increased to operate said magnet, and timing means effective to open said stop contacts a predetermined time interval following opening of the load circuit.

3. In an electrical welding system of the type having an alternating current driving motor adapted to be connected to alternating current supply lines through a main starter switch and a direct current welding generator driven by the motor and connected to an arc welding circuit, the starter switch having control circuits associated with the same for causing closing and opening of the main starter switch in response to closing and opening of start or stop contacts; a reactor of relatively low direct current resistance connected in series with the load circuit, a transformer having its primary supplied with alternating current from said current supply lines, means serving to effect closing of said start contacts including a magnet adapted to be energized, the secondary of the transformer being connected across said reactor in series with said magnet whereby when the load circuit is closed the current flow in the secondary circuit of the transformer is increased to operate said start contact, and means effective to open the stop contacts to cause opening of the main switch at the end of a predetermined interval following complete opening of the welding circuit.

RONALD R. DYSART.

REFERENCES CITED

The following references are of record in the file of this patent:

UNITED STATES PATENTS

| Number | Name | Date |
|---|---|---|
| 2,023,051 | Jones | Dec. 3, 1935 |
| 2,027,224 | David | Jan. 7, 1936 |
| 2,099,965 | Sarazin | Nov. 23, 1937 |
| 2,135,045 | Blankenbuehler et al. | Nov. 1, 1938 |
| 2,135,046 | Blankenbuehler | Nov. 1, 1938 |
| 2,170,861 | Hobart | Aug. 29, 1939 |
| 2,237,894 | Tyrner | Apr. 8, 1941 |
| 2,328,596 | Winsor | Sept. 7, 1943 |
| 2,340,114 | Duis | Jan. 25, 1944 |